July 13, 1926.
C. A. KRAUS
1,592,429
PROCESS OF TREATING GLASS AND THE PRODUCT THEREOF
Filed June 5, 1924
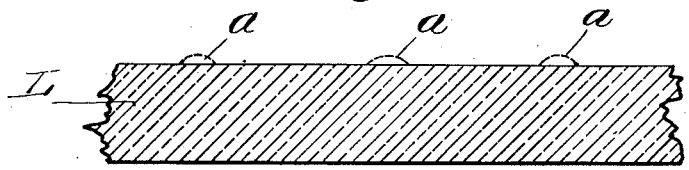
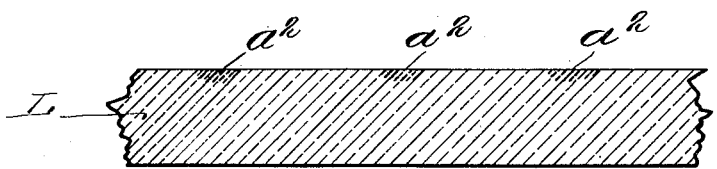
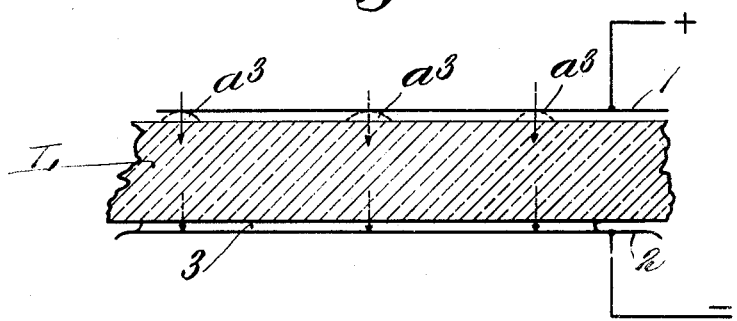
Inventor:
Charles A. Kraus.
by ... ...
his attys.

Patented July 13, 1926.

1,592,429

UNITED STATES PATENT OFFICE.

CHARLES A. KRAUS, OF WORCESTER, MASSACHUSETTS.

PROCESS OF TREATING GLASS AND THE PRODUCT THEREOF.

Application filed June 5, 1924. Serial No. 718,015.

My invention relates to the art of treating, and specifically of marking, articles of glass, and consists in a method of treating glass which may be used for applying marks or designs, either of utilitarian or æsthetic purpose, upon glass, and in the article of manufacture which results from the practice of the method, and one object of this invention is to provide articles made of glass, as for instance optical lenses, with marks which are ordinarily invisible, but which are developable into temporary visibility at will; and, with respect particularly to the provision of normally invisible and at the same time developable markings upon glass, the object is to mark the glass without any alteration in its superficial contour or optical characteristics.

Many manufactured articles of glass, such as mirrors, eyeglass lenses, etc., are finished with highly polished and accurately shaped surfaces, indispensable to the proper performance of their intended functions, so that the application thereto of marks, such as etched lines or designs, which remove surface-portions of the glass and alter both its polish and its optical characteristics at the part affected, is ruled out. Manufacturers of such articles have heretofore been unable to apply to the articles themselves any permanent or semi-permanent trade mark free from optical damage to the articles; it is obvious that adhesively attached, removable labels afford no protection against substitution of possibly inferior manufactures for the product desired and perhaps prescribed by the purchaser. Again, in the absence of any identifying mark on the article of glass itself, in case of breakage it is not possible to replace it with certainty by another of the same manufacture and quality, unless its previous individual history be known.

I have discovered that it is feasible to qualify or alter the constitution of a glass, at and near its surface, over determined areas, which for marking purposes are delimited, in such manner as to produce marking which is normally invisible, instantly and easily developed into visibility, and which does not alter either the geometrical contour of the surface or the optical qualities of the glass as a whole.

Most glasses are built up from a mixture of acidic and basic oxides; those glasses which are in most general use comprise silica and metallic oxides such as sodium and calcium oxides. The more electropositive metals in these glasses are present in the form or association of salts; in the case of silicate glasses in the form of silicates. And, as with all true salts, the electropositive constituent, to some extent at least, is in the ionic condition; that is to say, the atom of the metallic element of the salt is present, carrying an electric charge. The condition of electrical unsatisfaction, due according to current theory to an unbalance between the orbital electrons of the atom and its positive nucleus, is manifested by a tendency of the ion, or electrically unsatisfied atom, to move in its environment; response to this tendency is regulated by the environing structure. In glasses, the ions of the more emphatically electropositive elements are not held in position rigidly, but are to a sensible degree free to move. Their freedom or rapidity of movement is, broadly speaking, proportionate to temperature. A glass in fluid or semi-fluid condition (practically so regarded) is a conductor of electric current; but even at temperatures where the glass is practically rigid the ions are movable and under suitable conditions will move, in the body of the glass.

The character of glass implied by its definition as a supercooled liquid accounts for this mobility of ions within it even at temperatures when, according to practical and mechanical standards, the glass is rigid or solid.

Thus, under the influence of a potential gradient, the electropositive ions in glass can be made to move; and furthermore, these ions likewise move under the influence of a concentration gradient; in other words, diffusion takes place. Interdiffusion, i. e., mutual or reciprocal diffusion, will manifest itself between the ions in a glass and ions in a salt in contact with the glass. Interdiffusion will take place even though both the glass and the salt in contact with it are mechanically rigid or solid. The above-noted characteristics of ions present in the structure of glass are utilized to carry out the process and form the product which are the subject matter of the invention herein described.

The invention, while independent of specific variations of the indicated treatment, may conveniently be explained with incidental reference to the accompanying drawings, in which Fig. 1 is a diagram section of a glass object to be treated, showing an application of treating material;

Fig. 2 is a similar diagram indicating the accomplished result; and

Fig. 3 is a diagram illustrating the utilization of an electrical potential gradient as an incident of the process.

In the drawings, the glass article to be treated, which may be a figured or surfaced mirror, lens, or flat, ready for use, is shown at L.

Take for a specific example the ordinary soda-lime glasses, extensively employed in a miscellany of human uses; in such glasses the sodium ions are movable in the environing structure. If a salt, such as silver nitrate, is applied to a surface of a glass of this type, (as at $a$, Figs. 1, 2 and 3) although the deposit of such salt may be extremely thin as measured by ordinary standards, with respect and in relation to the movable ions such deposit is, in effect, a voluminous mass of silver nitrate in superficial contact with the mass of the glass. Under these conditions of contact interdiffusion takes place between the electropositive silver ions in the mass of silver nitrate and the electropositive sodium ions in the mass of the glass; the silver ions diffuse into the glass and the sodium ions diffuse out of the glass and into the silver nitrate. Thus, in the glass, which is the substance to be affected by the process, there is a replacement of sodium ions by silver ions in the region delimited by the distribution of the silver nitrate upon the glass surface. This replacement of sodium ions by silver ions does not alter the superficial contour of the glass, or affect its optical properties, the silica and other ingredients of the glass retaining their original position and arrangement, while the silver ions occupy positions formerly occupied by sodium ions.

It will now be apparent that the contour of the mass of silver nitrate deposited on the glass surface will presently be reproduced by an assemblage of silver ions which have diffused into the glass (as indicated at $a^2$, Fig. 2) from a multitude of points distributed over the surface of contact between the silver nitrate and the glass; and that if the silver nitrate is deposited in the form of a mark or design, as for instance the trade mark of the maker of the glass, that mark or design is outlined in the glass by the assemblage of silver ions which have penetrated into its surface-portions.

If the replacement of sodium ions by silver ions is allowed to proceed only to a very slight degree, the pattern or mark outlined in silver ions in the glass will be wholly invisible, requiring other treatment to be rendered visible either temporarily or permanently. Therefore this local alteration of the constitution of the glass will not impair its utility for optical purposes; optical lenses, for instance, so marked are equally useful with and cannot be ordinarily distinguished from lenses not so marked.

But, since a thin film, of delimited area and intended shape or design, of the surface-portion of the glass has been altered by the substitution of silver ions for sodium ions, it is possible to make this altered film visible: To render it temporarily visible, which will be all that is required for the detection of a trade mark, all that is necessary is to condense the vapor of a suitable liquid upon the surface of the glass. When a liquid comes in contact with a solid surface, there is a definite interaction between the liquid and the solid surface, dependent on the nature of both. When a vapor is condensed on a solid surface, minute drops are formed, and the number, size, and density of distribution of these drops depends on the nature of the liquid and that of the solid. The surface of a soda-glass which has been locally altered as by the exchange of silver ions for sodium ions exhibits a differential in effect upon condensed moisture, so that, if a glass so marked is breathed upon, under temperature conditions which produce condensation, the water condensed on the silver-marked portion of the surface differs in the arrangement of the drops from the water condensed on the unaltered surrounding or adjoining surface to such a degree that the mark is distinctly contrasted with the adjacent glass surface, and can readily be seen so long as the moisture remains condensed.

The depth to which the silver ions,—in the example selected for illustration,—penetrate into the body of the glass and replace sodium ions which at the same time diffuse out of the glass and into the deposit of silver nitrate depends on the time the two substances, silver nitrate and soda-glass remain in contact, also upon the temperature maintained while interdiffusion is in progress. After the intrusion into the glass of the silver ions, further diffusion takes place, but the rate of this diffusion in relation to the temperature may be represented by a curve of the exponential type; at normal and usual temperatures the dissemination of the silver ions is negligibly slow; a degree of diffusion resulting at a temperature of 150° C. in a practically short time measured by minutes would require a long term of years at ordinary temperatures.

The process of penetration of the silver ions into the glass can be accelerated by applying a potential gradient which tends to drive the electropositive silver ions into the glass. For example, as indicated in Fig. 3, the salt in the form of a concentrated solution as indicated at $a^3$, $a^3$, or in the form of a liquid, or even solid, provided the necessary electrical contact can be made, is applied to those portions of the glass surface which are to be altered. Electrical connections by means of a suitable conductor 1 must be made between the applied salt solution or the salt in other form and a source of unidirectional potential. The opposed surface of the glass (to that to which the salt is applied) is electrically connected to the other pole of the same source of potential. The contact between the surface and the negative conductor 2 may be effected by means of a conducting liquid at 3, which may either be a metal making contact with the surface of the glass or a fluid such as a solution of a salt in water. The only condition to be observed is that if a solution or metal is applied to the surface of the glass it must not react with the glass under the conditions of treatment. The salt of the ion which is to be introduced into the glass is connected to the positive pole of the source of uni-directional potential and the opposing surface is applied to the negative, so that the direction of the potential is such as to drive the positive ions from the surface which carries the salt toward the opposing surface. It should be borne in mind that in a glass only the positive ions are capable of motion. The negative ions are fixed in position and undergo no change in the course of the process of substitution. In the case of most salts, the positive ion only is capable of motion in the solid condition of the salt, so that interdiffusion of the positive ions of a solid salt and of the glass takes place. Similarly, when the glass as above described is subjected to the action of a potential gradient by means of an externally applied potential, only the positive ions move appreciably under the action of the potential gradient and a substitution of the positive ions of the glass by the positive ions of the applied salt takes place through the gradual motion of the boundary between the ions of the salt in the glass into the body of the glass. During this process interdiffusion may take place, but if the condition is fulfilled that the movable ion of the glass moves more rapidly under a given gradient than the corresponding ion of the salt under the same conditions, then the boundary will remain sharp. The rate of motion of the ions under the action of a potential gradient is the greater the greater the potential gradient. There is no limit to the potential gradient which may be applied except that it must not reach such a value that the glass is punctured by a disruptive discharge. It is known that glass is very resistant to the action of such disruptive discharges, so that relatively high potentials, for example in the neighborhood of a thousand volts per millimeter or even more, may be applied to the glass without rupturing the same.

The ions normally present in the glass, as for example the sodium ions in a soda-lime glass, move in the body of the glass and thus in the immediate neighborhood of the negative pole pass out through the surface of the glass at this pole. As fast as these ions pass out of the glass into the adjoining material, which may be either a liquid metal or a solution, other ions from the interior of the glass take their place and this surface of the glass undergoes no alteration whatsoever, as a result of the above prescribed process. In general, the higher the potential, the shorter the time required in order to provide for a given depth of penetration into the glass. The rate of motion of the ions under the action of a potential gradient depends upon the diffusion coefficient of the ions in the glass and will therefore take place the more readily, other things being equal, the higher the temperature. Owing to the possibility of applying a high potential gradient, the rate of progress of the ions into a glass under the action of the potential gradient and under otherwise corresponding conditions may be made much greater than the rate of penetration under the process of interdiffusion.

In glasses the only movable constituents are the positive ions. While there are negative ions present these are fixed in position and are not capable of motion. When a potential is applied, for example, the positive ions move but the negative ions retain their original position. It is due to this particular condition indeed that the surface of the glass undergoes no change in the process of interdiffusion. In most solid salts, as in the glasses, only the positive ions are capable of motion. It is scarcely conceivable that glasses can exist in which the negative ions would be capable of motion.

If silver ions are allowed or caused to penetrate a glass to a sufficient depth, the marking due to their presence becomes permanently visible, so that, for the purpose of marking optical glass, the diffusion of silver ions into the glass should be arrested before the permanently visible stage is reached; or the glass should be subjected to further treatment, to render the marking normally invisible.

To illustrate the process more definitely, take the case of an eyeglass lens. After the lens has been ground and polished, a small quantity of silver nitrate is applied to its surface, covering a delimited area of the glass. As silver nitrate is a solid at ordinary temperatures, the most convenient method is to dissolve the nitrate in a solvent and apply it to the glass in solution. It may be dissolved in water for this purpose, but pyridine is preferable, or pyridine with small quantities of water and alcohol added to give the solution a manipulable consistency. It should not be so thin as to run or spread on the glass, nor should it be of such consistency as to dry too quickly, since the intimate contact with glass, promoted by the fluidity of the solution, is a desirable condition. If the nitrate solution be applied with a pen or brush, it should be thin enough to flow from the instrument, if by means of a stamp, it should be viscous enough to adhere effectively and in suitable amount to the surface of contact. A large amount per unit area is not necessary; a thin film sufficient to thoroughly cover the surface to be affected will suffice.

After the silver nitrate mark has been applied to the glass, the lens is preferably heated to a temperature from 100° to 180° C., and there maintained for a length of time which depends on the desired character of the marking. If a marking which is to remain on the glass and be developable to visibility in the manner above described only for a short time, say, until the lens has been sold, the temperature of treatment should be in the lower part of the range suggested, and the time of treatment short. Treatment at 150° C. for from three to ten minutes will produce an adequate, though relatively temporary, marking on the glass. Ten minutes heat treatment at 160° C. will produce a marking which is practically permanent and which will withstand a considerable amount of wiping and hand polishing without becoming obliterated.

After the lens has thus been treated, the silver nitrate is washed off, and the lens dried. It will then be found that a faint mark is visible upon it. The lens is then subjected to further heat treatment at a somewhat higher temperature than before, say at 220° C. for a period varying from twenty to sixty minutes, depending on the depth to which the silver ions have diffused into the glass. Under these conditions the silver ions which are relatively densely distributed next to the surface of the lens interdiffuse with sodium ions which lie in the adjacent interior of the lens-body, and the mark, previously faintly visible, becomes invisible, but ready to manifest its presence visibly when the lens is breathed upon. A lens into which the silver ions have been allowed to penetrate deeply will preserve the marking more permanently and withstand a considerable amount of polishing without losing the mark of identification.

For the purposes of the glass-marking process, the use of a silver salt is preferred. Other metal salts will, however, produce similar effects under generally similar treatment. For example, potassium sulfocyanate or lithium nitrate will serve the purpose. But in the cases of these two salts care should be taken to restrict the depth of diffusion of the ions into the glass because, if the penetration be too great the glass affected by it is liable to disintegrate.

I claim:

1. The process of treating glass, characterized by substitution in a delimited region in glass, for ions normally present in the glass, of ions of different atomic number, in quantity so restricted as to be normally invisible, but in quantity sufficient to be developable to visibility by differential condensation of liquid upon the glass.

2. Glass, characterized by the presence in a delimited region thereof, of ions of atomic number different from those in the glass adjoining the said delimited region, in quantity so restricted as to be normally invisible, but in quantity sufficient to be developable to visibility by differential condensation of a liquid upon the glass.

3. The process of treating glass, characterized by substitution in a delimited region in glass for ions normally present in the glass, of silver ions in quantity so restricted as to be normally invisible, but in quantity sufficient to be developable to visibility by differential condensation of a liquid upon the glass.

4. Glass, characterized by the presence in a delimited region thereof, of silver ions in quantity so restricted as to be normally invisible but in quantity sufficient to be developable to visibility by differential condensation of a liquid upon the glass.

5. The process of treating glass, characterized by depositing on the glass a salt comprising ions of atomic number different from those in the glass, heating the glass and the salt to promote interchange of ions therebetween, removing the salt and maintaining heat in the glass to diffuse ions therein derived from the salt.

6. The process of treating glass, characterized by depositing a silver salt on the glass, heating both to promote interchange of ions therebetween, removing the salt and maintaining heat in the glass to diffuse the silver ions therein.

Signed by me at Worcester, Massachusetts, this the twenty-ninth day of May 1921.

CHARLES A. KRAUS.